(12) United States Patent
Qiu et al.

(10) Patent No.: US 8,902,787 B2
(45) Date of Patent: Dec. 2, 2014

(54) APPARATUS AND METHOD FOR DEPLOYING NETWORK ELEMENTS

(75) Inventors: Chaoxin Qiu, Austin, TX (US); Arshad Khan, Austin, TX (US); Niral Sheth, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1005 days.

(21) Appl. No.: 12/429,922

(22) Filed: Apr. 24, 2009

(65) Prior Publication Data

US 2010/0271975 A1 Oct. 28, 2010

(51) Int. Cl.
*H04L 12/28* (2006.01)
*H04B 7/00* (2006.01)
*H04L 12/24* (2006.01)
*H04L 12/26* (2006.01)

(52) U.S. Cl.
CPC ............ *H04L 43/50* (2013.01); *H04L 41/0853* (2013.01); *H04L 65/1015* (2013.01); *H04L 12/2697* (2013.01)
USPC .......................................... 370/254; 455/515

(58) Field of Classification Search
USPC ........................................................ 370/254
See application file for complete search history.

(56) References Cited

U.S. PATENT DOCUMENTS

| | | | |
|---|---|---|---|
| 2003/0027595 A1* | 2/2003 | Ejzak | 455/560 |
| 2003/0074606 A1 | 4/2003 | Boker | |
| 2004/0029576 A1* | 2/2004 | Flykt et al. | 455/422.1 |
| 2004/0218609 A1* | 11/2004 | Foster et al. | 370/401 |
| 2005/0032544 A1* | 2/2005 | Jei | 455/550.1 |
| 2006/0140385 A1* | 6/2006 | Haase et al. | 379/221.09 |
| 2006/0149847 A1* | 7/2006 | Meskauskas et al. | 709/229 |
| 2006/0287015 A1* | 12/2006 | Dunko | 455/575.4 |
| 2008/0056170 A1* | 3/2008 | Komulainen et al. | 370/311 |
| 2008/0168520 A1 | 7/2008 | Vanderhoff et al. | |
| 2009/0191873 A1* | 7/2009 | Siegel et al. | 455/435.2 |
| 2010/0198939 A1* | 8/2010 | Raleigh | 709/217 |

* cited by examiner

*Primary Examiner* — Brandon Renner
(74) *Attorney, Agent, or Firm* — Hanley, Flight & Zimmerman, LLC

(57) ABSTRACT

A system that incorporates teachings of the present disclosure may include, for example, a server having a controller adapted to determine at least one network element to be designated as being in a probation mode where the network element is operably coupled to an Internet Protocol Multimedia Subsystem (IMS) network and is adapted to utilize Session Initiation Protocol, and determine communication devices to be designated as testing devices where the communication devices are user end point devices, wherein use of the network element for communication between user end points over the IMS network is limited to the testing devices. Other embodiments are disclosed.

20 Claims, 6 Drawing Sheets

100

400

APPARATUS AND METHOD FOR
DEPLOYING NETWORK ELEMENTS

FIELD OF THE DISCLOSURE

The present disclosure relates generally to communication systems and more specifically to an apparatus and method for deploying network elements.

BACKGROUND

Communication networks communicate information between end points utilizing various equipment, including routers, switches, digital subscriber line access multiplexers. Internet Protocol Multimedia Subsystem (IMS) networks utilize IMS-based network processors, such as P-CSCF, S-CSCF, HSS, IMS-compliant application servers and so forth. As the networks grow, providers may add more equipment to meet the demands of the users. As technology advances, providers may replace existing equipment with newer equipment.

DETAILED DESCRIPTION

Figure 1:
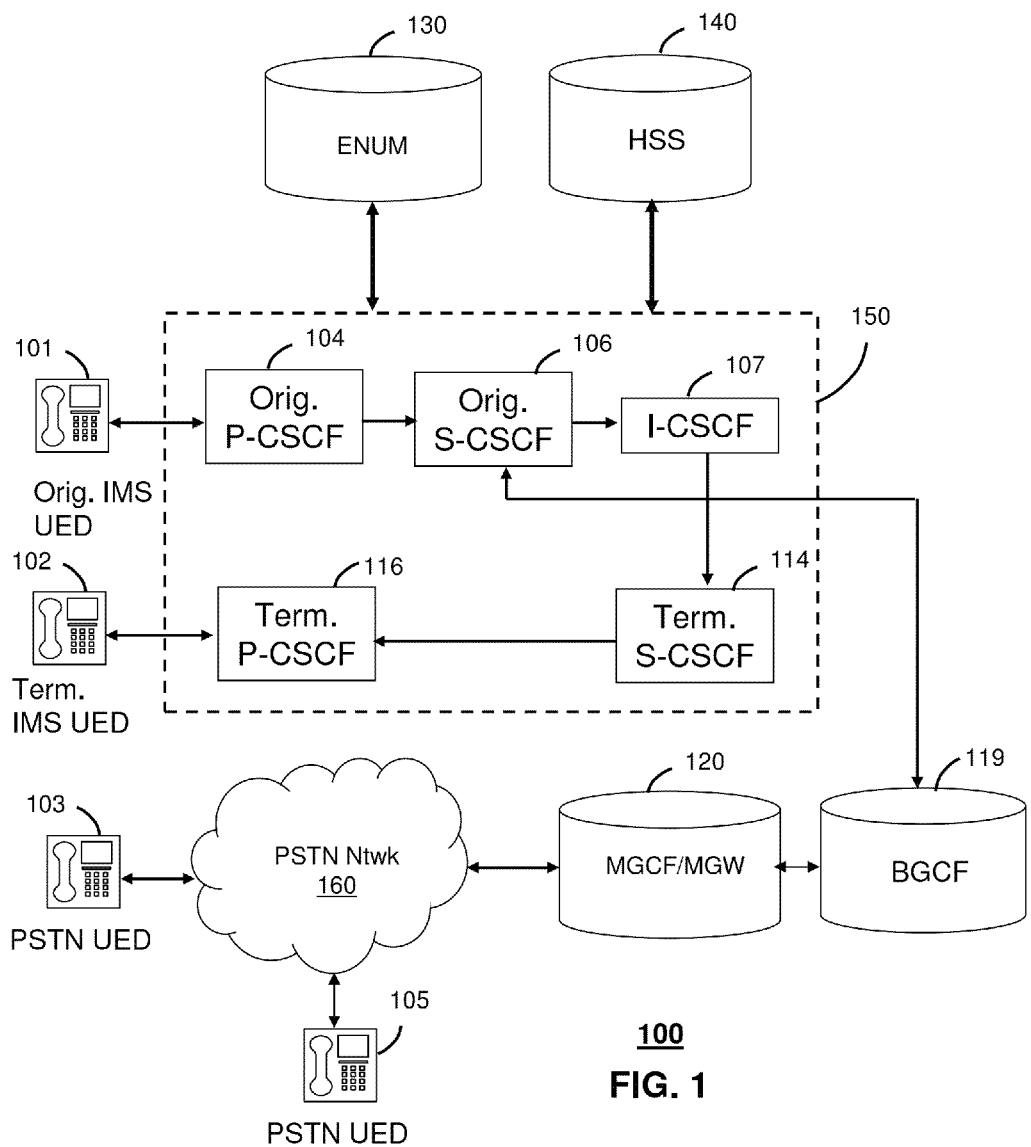
FIGS. 1-2 depict illustrative embodiments of communication systems that provide media services.

One embodiment of the present disclosure can entail computer-readable storage medium operably coupled to an Internet Protocol Multimedia Subsystem (IMS) network where the storage medium includes computer instructions to determine at least one network element to be designated as being in a probation mode where the network element is operably coupled to the IMS network and adapted to utilize Session Initiation Protocol, determine a plurality of communication devices to be designated as testing devices where the communication devices are user end point devices, generate configuration information associated with the testing devices when the network element includes Proxy Call Session Control Function (P-CSCF), and provide the configuration information to a device management server operably coupled to the IMS network, where the testing devices are registered with the network element based on the configuration information when the testing devices are communicatively coupled with the IMS network.

Another embodiment of the present disclosure can entail a server having a controller to determine at least one network element to be designated as being in a probation mode where the network element is operably coupled to an Internet Protocol Multimedia Subsystem (IMS) network and adapted to utilize Session Initiation Protocol, and determine communication devices to be designated as testing devices, where the communication devices are user end point devices, and where use of the network element for communication between user end points over the IMS network is limited to the testing devices.

Yet another embodiment of the present disclosure can entail a network element operably couplable to an Internet Protocol Multimedia Subsystem (IMS) network where the network element includes a controller adapted to utilize Session Initiation Protocol, and transmit packets over the IMS network, where use of the network element for communication between user end points over the IMS network is limited to pre-determined testing devices that are end point devices.

Yet another embodiment of the present disclosure can entail an end user device having a controller adapted to communicate with an end point over an Internet Protocol Multimedia Subsystem (IMS) network utilizing Session Initiation Protocol, register with a predetermined network element of the IMS network where the network element includes Proxy Call Session Control Function (P-CSCF) and is designated as in a probation mode with registration limited to a predetermined group of testing devices comprising the end user device.

Yet another embodiment of the present disclosure can entail determining at least one network element to be designated as being in a probation mode, coupling the network element to an Internet Protocol Multimedia Subsystem (IMS) network, determining communication devices to be designated as testing devices where the communication devices are user end point devices, and limiting use of the network element for communication between user end points over the IMS network to the testing devices.

Yet another embodiment of the present disclosure can entail lifting the probation status from the network element. The deployment system can declassify the probation network element as normal and declassify the testers as normal subscribers. The deployment system can database and commit the configuration change and send the information to the provisioning server. If the P-CSCF function is part of the probation network elements, the provisioning server can modify the configuration parameters for the tester's end point devices. The provisioning server can modify its local database to mark the tester accounts as normal subscriber accounts and can further communicate with all HSS servers to mark those tester accounts as normal accounts so that these tester subscribers can now be assigned to other S-CSCF and application servers. If the HSS function is part of the probation network element, the provisioning server can modify its own local database to indicate the HSS server is not in probation mode to allow the network to provision other subscriber's subscription profile to the new HSS server. If the S-CSCF function is part of the probation network element, the provisioning server can modify its own local database to indicate that the S-CSCF is not in probation mode and the provisioning server can communicate with all HSS servers to change the S-CSCF instances from probation mode to normal mode. If an application server instance is a part of the probation network element, the provisioning server can modify its local database to flag these application servers as being in normal operation mode.

FIG. 1 depicts an illustrative embodiment of a communication system 100 employing an IP Multimedia Subsystem (IMS) network architecture to facilitate the combined services of circuit-switched and packet-switched systems. Communication system 100 can be overlaid or operably coupled with other communication systems such as Wireless Fidelity (WiFi), cellular communication technologies (such as GSM, CDMA, UMTS, WiMAX, Software Defined Radio or SDR, and so on), iTV and so forth.

Communication system 100 can comprise a Home Subscriber Server (HSS) 140, a tElephone NUmber Mapping (ENUM) server 130, and other common network elements of an IMS network 150. The IMS network 150 can establish communications between IMS compliant User Endpoint Devices (UEDs) 101, 102, Public Switched Telephone Network (PSTN) UEDs (such as Customer Premises Equipment) 103, 105, and combinations thereof by way of a Media Gateway Control Function (MGCF) 120 coupled to a PSTN network 160. The MGCF 120 can be utilized when PSTN UEDs need to establish communication sessions with IMS UEDs (or reversely, i.e., if IMS UEDs need to communicate with PSTN UEDs), but do not need to be used for communication sessions between two IMS UEDs.

IMS UEDs 101, 102 can register with the IMS network 150 by contacting a Proxy Call Session Control Function (P-CSCF) which communicates with a corresponding Serving CSCF (S-CSCF) to register the UEDs with the HSS 140. To initiate a communication session between UEDs, an originating IMS UED 101 can send a Session Initiation Protocol (SIP INVITE) message or request to an originating P-CSCF 104 which communicates with a corresponding originating S-CSCF 106. The originating S-CSCF 106 can submit queries to the ENUM system 130 to translate an E.164 telephone number in the SIP INVITE to a SIP Uniform Resource Identifier (URI) if the terminating communication device is IMS compliant. The SIP URI can be used by an Interrogating CSCF (I-CSCF) 107 to submit a query to the HSS 140 to identify a terminating S-CSCF 114 associated with a terminating IMS UED such as reference 102. Once identified, the I-CSCF 107 can submit the SIP INVITE to the terminating S-CSCF 114. The terminating S-CSCF 114 can then identify a terminating P-CSCF 116 associated with the terminating UED 102. The P-CSCF 116 then signals the UED 102 to establish communications.

If the terminating communication device is instead a PSTN UED such as references 103 or 105, the ENUM system 130 can respond with an unsuccessful address resolution which can cause the originating S-CSCF 106 to forward the call to the MGCF 120 via a Breakout Gateway Control Function (BGCF) 119. The MGCF 120 can then initiate the call to the terminating PSTN UED by common means over the PSTN network 160.

The aforementioned communication process is symmetrical. Accordingly, the terms "originating" and "terminating" in FIG. 1 are interchangeable. It is further noted that communication system 100 can be adapted to support audio or video or multi-media conferencing. In addition, communication system 100 can be adapted to provide the IMS UEDs 101, 103 with multimedia and Internet services. The present disclosure contemplates various protocols being utilized to support video/multi-media conferencing.

In one embodiment, system 100 can utilize Media Gateways (MGWs) to provide connectivity for legacy Time Division Multiplexing (TDM)-based services, such as traditional PSTN and GSM. The MGWs can provide inter-working between RTP/UDP/IP voice packet streams and circuit-based TDM voice trunks. Coupling with a set of MGWs, MGCF 120, including its signaling gateway functions, can control the MGWs for bearer path management and can provide call signaling interworking between the SIP-based VoIP networks and the legacy ISUP-based TDM networks.

In one embodiment, a deployment system can be utilized for deploying network elements into the system 100, such as P-CSCF, HSS, S-CSCF, IMS-compliant Application Servers and so forth into the IMS network. The deployment system can provide a provisioning interface for network operational personnel to place one or more network elements in a probation mode and to designate a group of users as the exclusive users of the network elements in probation. In another embodiment, the deployment system can provide an enhanced process in user provisioning to make configuration changes for affected user accounts, such as changing the domain names or IP addresses of network contact lists for those users' devices. For instance, a set of designated proxy-CSCFs can be presented if new probation network elements include such functions.

In one embodiment, the deployment system can assign designated user accounts to specific application servers if the new network elements include new application servers. Designated user accounts can be provisioned to the databases of such application servers. In another embodiment, the deployment system can inform a Home Subscriber Server (HSS) to mark specific network elements in probation mode and to mark the designated subscribers as the exclusive users of those network elements.

The deployment system can allow network operators to deploy new network elements and/or products to production networks in a probation mode and limit only designated users (such as testers and beta users) to use of those devices. The deployment system can allow the network operators to make the new network elements available to more and more users in a gradual manner, and eventually make the new network elements formally part of the production network (such as lifting the probation status).

The use of the deployment system can allow service providers to deploy new network elements or to upgrade existing network elements in a gradual and controlled manner through probation mode deployment and limited user accessibility. More users can be provisioned to use the new network elements as the system stabilizes; and finally the new network elements can be available to all users by lifting the restriction. The deployment system can allow service providers to reduce the testing cycle for the introduction of new network elements or system upgrades. The deployment system can improve the time-to-market for new service introduction; improve the responsiveness of the network to market growth; and/or reduce the operational cost and capital expenses of multiple stages of testing.

Figure 2:
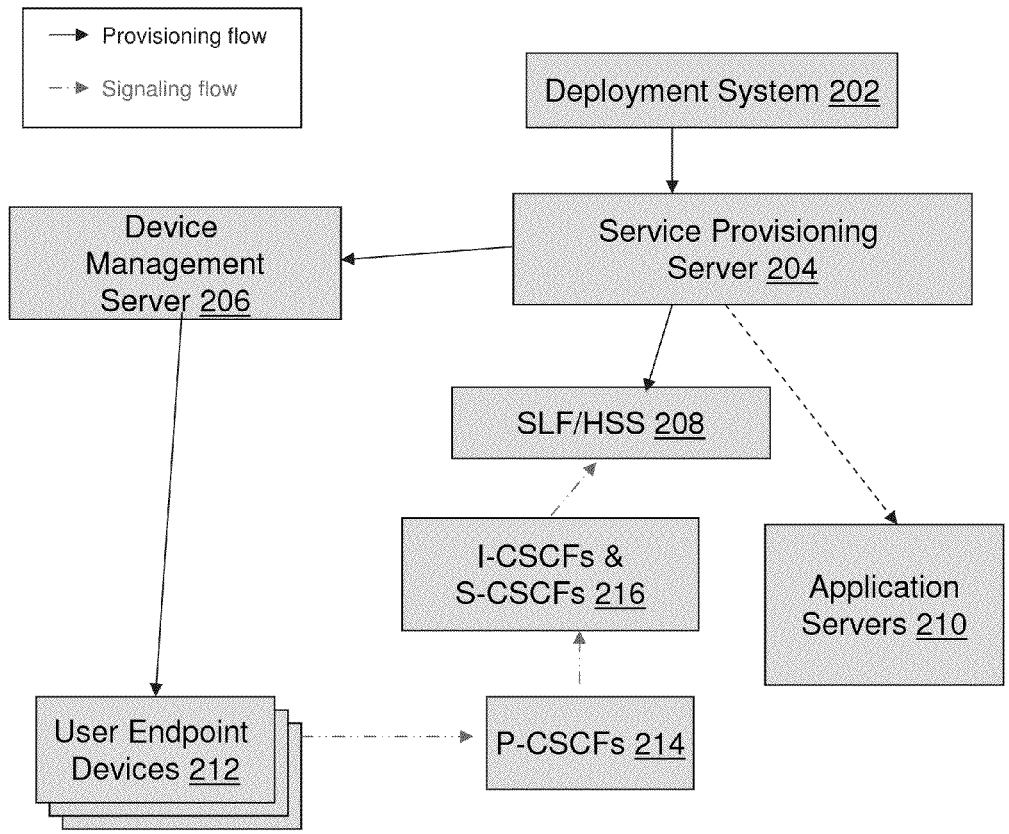
Figure 3:
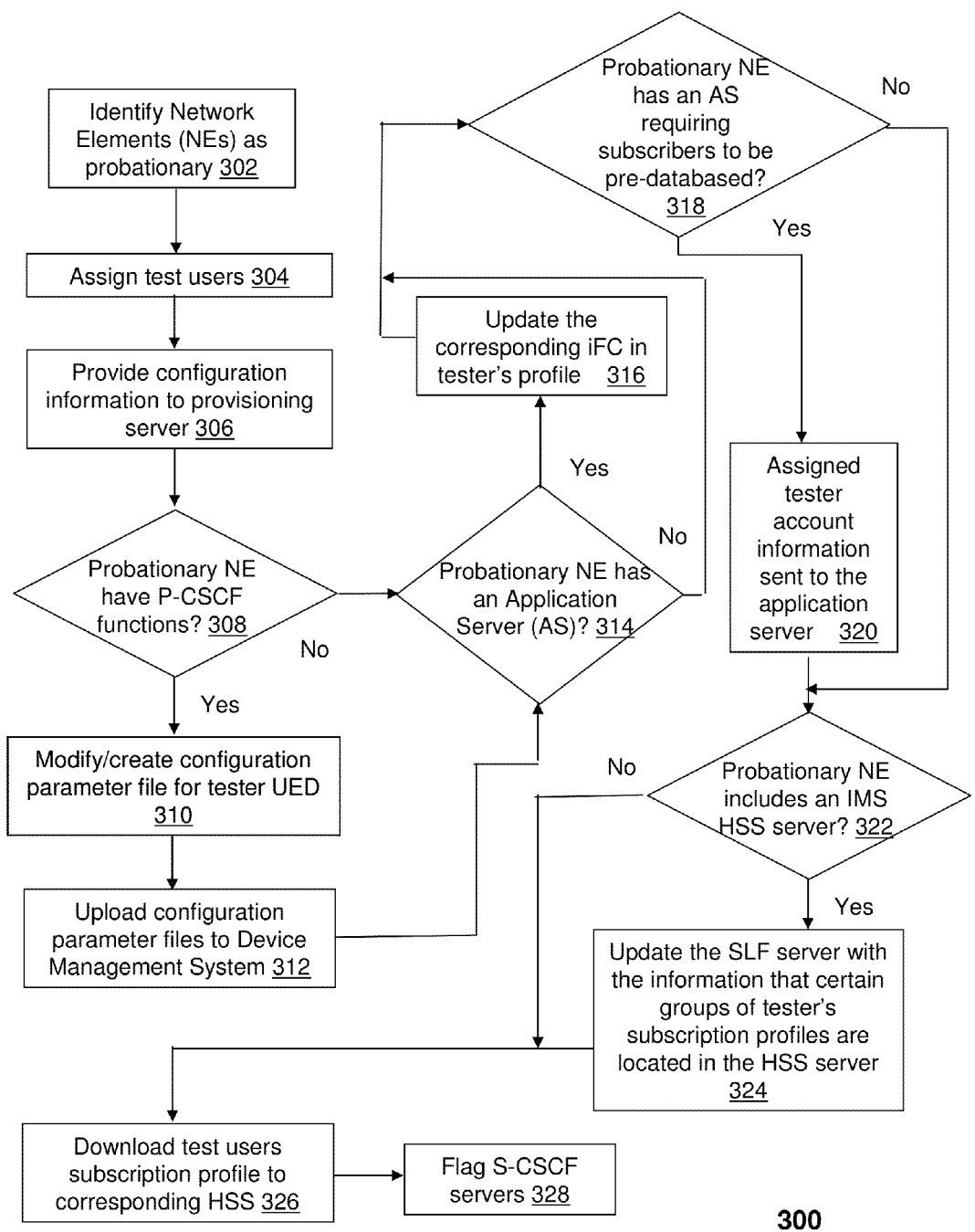
FIGS. 3-5 depict illustrative embodiments of methods operating in portions of the communication systems of FIGS. 1-2.

FIG. 2 depicts a communication system 200 that can operate according to the process of FIG. 3. System 200 can include a deployment system 202 so that network elements can be inventoried and/or retrieved, and a list of such network elements can be presented to operational personnel. The deployment system 202 can include a GUI for designating some network elements as being in probation mode and designating a set of testers for the probation network elements. The system 200 can also include service provisioning server 204, a device management server 206, an SLF/HSS 208, application servers 210, user end point devices 212, P-CSCFs 214, and I-CSCFs and S-CSCFs 216.

Provisioning information can flow from the deployment system 202 to the service provisioning server 204 and then to one or more of the device management server 206, the SLF/HSS 208 and the application servers 208. The device management server 206 can provision the user endpoint devices 212 with provisioning information. As is also shown in FIG. 2, signaling flow can occur from the user endpoint devices 212 to the P-CSCFs 214, the I-CSCFs 216, S-CSCFs 216, and the SLF/HSS 208. The service provisioning server 204 can change the configuration parameter(s) for testers; mark the probation network elements as being inaccessible to other subscribers; send modified configuration for testers DMS, which pass the configuration to tester's devices; send necessary information to the HSS to mark probation network elements; and/or send tester information to application servers in probation mode if required. When a user registers, the I-CSCF 216 can query the HSS 208 for S-CSCF assignment.

The HSS 208 can assign testers to probation S-CSCFs 216, and other users to other normal S-CSCFs.

In method 300, the deployment system 202 can identify or otherwise designate network elements from a list of network elements as being in a probation mode as in step 302. The deployment system 202 can assign a set of users (such as beta testers) that will be accessible to the network elements in probation mode as in step 304. The deployment system 202 can store the corresponding configuration information in a database or the like.

In one embodiment, the deployment system 202 can access identifying information associated with the network elements, such as URI, FQDN, or IP address, and/or can import the list of network elements from a network management system (or inventory system). In another embodiment, the deployment system 202 can allow operation staff to manually key in additional network elements. In one embodiment, the deployment system 202 can provide a means to categorize testers into different groups or categories, such as: (1) testers belonging to various organizations of the service provider where these testers can be pre-databased and identified by their teams; and (2) volunteer users who volunteer at different times for different service rollout projects where the deployment system provides means for operational staff to key in the information for these testers as needed and to modify/delete these tester accounts when the project is over. In another embodiment, the deployment system 202 can provide a means to assign a group of testers to those network elements that are already in probation mode thereby allowing for users to be added to or removed from the network elements.

In step 306, the provisioning server 204 can receive the configuration information. In steps 308 and 310, the provisioning server 204 can modify or create a configuration parameter file for a tester's end point device if the network element in probation mode includes P-CSCF functions. In one embodiment, devices can be provided with the information of the available P-CSCFs 214 that a device can contact to register. The information can be provided in various forms, including URIs, FQDNS, or IP address(es). In another embodiment, the provisioning server 204 can provide the FQDNs for probation P-CSCFs to the tester device's configuration and/or provide FQDNs for other normal P-CSCFs to other subscriber device's configuration.

In step 312, the provisioning server 204 can upload the affected configuration files to a device management server 206. In one embodiment, IMS user endpoint devices 212 can have the capability to check with the device management server 206 and to update its configuration parameters periodically and automatically. For example, when a tester's device updates its configuration file, it can be able to re-register to the designated P-CSCF 214 in a probation network element.

In steps 314 and 316, the deployment system 202 can check to see if the probation NE includes an application server 210. If so, the deployment system 202 can update the corresponding iFC in the tester's service subscription profile so that S-CSCF will be able to forward the SIP INVITE to the appropriate application server in the designated probation NE when processing a call for the tester in the future. In steps 318 and 320, the deployment system 202 can check to see if the probation NE includes an application server to which the subscribers need to be pre-databased. If so, the deployment system can assign testers to the application server and send the required tester account information to the application server. In steps 322 and 324, the deployment system 202 can check to see if the probation NE includes an IMS HSS server 208. If so, it can update the SLF (Subscriber Location Function) server with the information that certain groups of tester's subscription profiles are located in the HSS server in the probation NE.

In one embodiment, the subscriber information and system information can be sent to the responsible HSS 208 in order to mark the probation network elements. The provisioning server 204 can have access to the information for the tester's subscription profile. For example, the provisioning server 204 can download the tester's subscription profile to the responsible HSS server 208, which may be a HSS in normal operational mode or an HSS server in probation mode as in step 326. The provisioning server 204 can also indicate to the HSS 208 which S-CSCF corresponds with a probation network element. In one embodiment, in the HSS server, the list of S-CSCF servers 216 can be flagged as either "normal" S-CSCF for general usage and "probation" S-CSCFs only available for testers as in step 328. This can be necessary since the HSS will be responsible for assigning a registering user to an appropriate S-CSCF.

Figure 4:
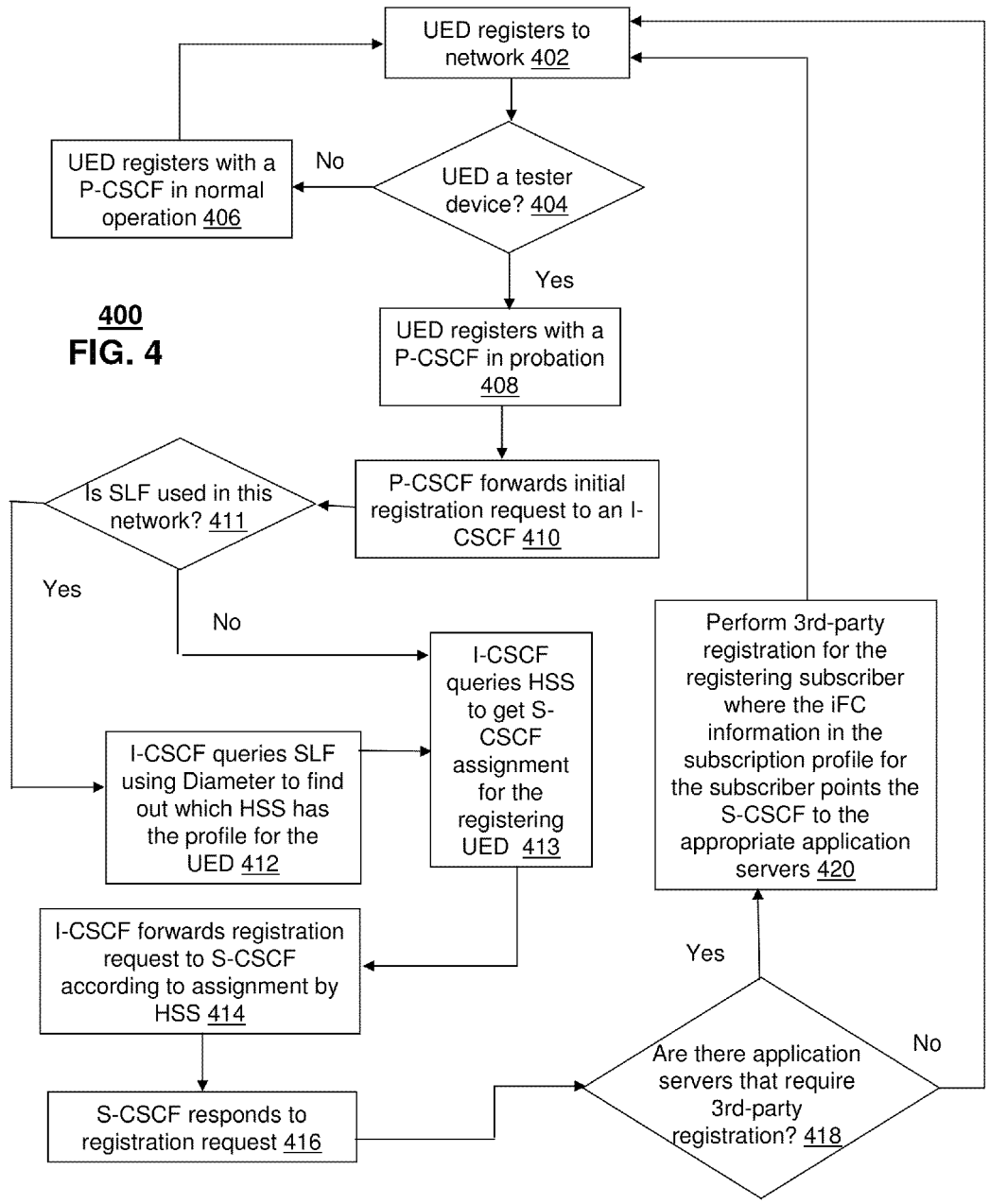

Referring additionally to process 400 of FIG. 4, when a user's endpoint device registers to the network as in step 402, if the device is not an identified tester as determined in step 404, then the configuration of the device has not been modified. It will register to one of those P-CSCFs in normal operation mode as in step 406. If the device is identified as a tester's device, then the device's configuration has been modified through the upload of the information to the device management system. When the device is to register (or re-register), the use of the configuration information can direct the device to a P-CSCF in a probation network element as in step 408. The tester device can send the registration request to the P-CSCF of the probation network element.

In step 410, when a probation P-CSCF receives an initial registration request, the P-CSCF can forward the request to an I-CSCF 216. In one embodiment, method 400 can operate without allowing for the I-CSCF to be placed in a probation mode, however the present disclosure contemplates the deployment system having the capability to place the I-CSCF in probation mode. The I-CSCF can query the HSS server for the S-CSCF assignment. The HSS server can assign testers to the probation mode S-CSCFs, while assigning other users to normal S-CSCFs. In one embodiment, if SLF is used in the network, then an I-CSCF can send a Diameter protocol query to an SLF to find out in which HSS the registering subscriber is databased as in steps 411 and 412. For instance, if the tester is using a probation HSS, the SLF can direct the I-CSCF to query the probation HSS for the tester's service subscription information in its query response to I-CSCF (step 412). In step 413, the I-CSCF can send the Diameter protocol query to the HSS for the registering subscriber's information. The HSS can respond to the query to advise the I-CSCF to forward the registration request to an appropriate S-CSCF (step 413). The HSS (such as either an existing HSS in normal mode or a new HSS in probation mode) can contain enhanced information for a list of available S-CSCFs with a flag for each S-CSCF to indicate which is in probation mode and which is not. This can also include enhanced subscriber's subscription profiles that indicate whether or not the subscriber is a normal customer or a tester who is accessible to the probation mode S-CSCF.

In one embodiment, based on IMS standards, the HSS can be responsible to assign each registering subscriber to a S-CSCF. The assignment can be based on a number of factors, including load balancing and subscriber's domain. The HSS may not assign a normal subscriber to a probation mode S-CSCF; and it can assign a tester to one of the probation mode S-CSCFs. The I-CSCF can then forward the registration request to a S-CSCF according to assignment by HSS as in step 414. If the registering subscriber is a tester, the request can be forwarded to a probation mode S-CSCF. The S-CSCF can perform procedures such as defined by IMS protocols in responding to the registration request as in step 416. The S-CSCF can access the HSS for subscriber information, and can query the SLF to determine which HSS the subscriber information is located. It will then be able to query the appropriate HSS server for the subscriber information.

In one embodiment in steps 418 and 420, the S-CSCF can perform 3rd-party registration for the registering subscriber after the AAA procedure is completed and successful where there are application servers that require third party registration. The iFC information in the subscription profile for the subscriber can advise the S-CSCF of the application servers to be utilized. For example, if the subscriber is a tester and an application server is in probation mode, the iFC can advise the S-CSCF of the corresponding application server in probation mode. After the registration is successful, the subscriber will be able to be served by the same P-CSCF, S-CSCF, HSS, and application servers as long as the registration status has not expired. The user endpoint device can re-register periodically according to the IMS standard. All the subsequent service requests and re-registration can be processed using the same set of IMS functions. If the subscriber is a tester and one or more of the IMS functions are in probation mode, the tester can continue to use the probation mode network elements for services.

Figure 5:
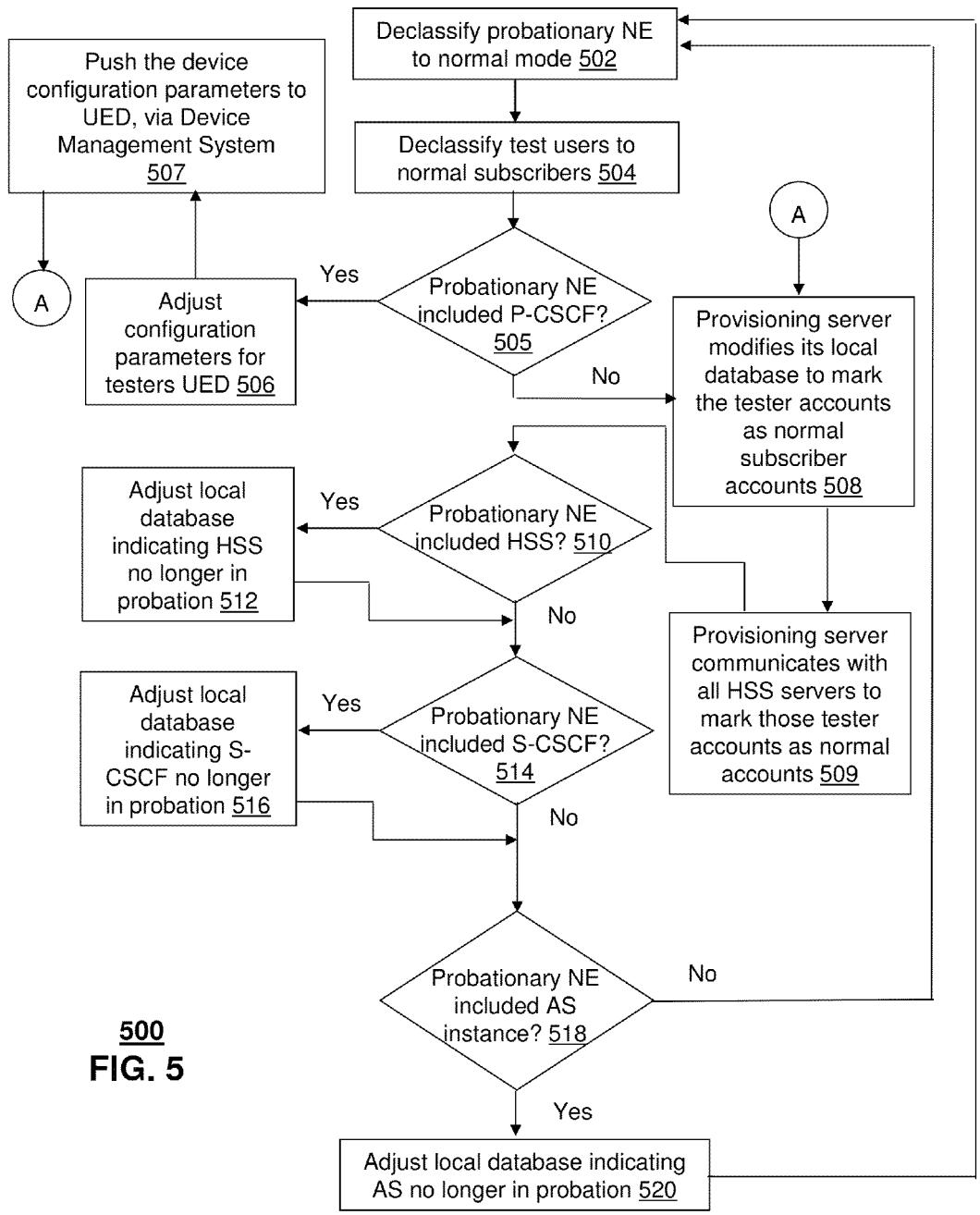

In one embodiment as shown in FIG. 5, once a network element has been monitored for performance and satisfied its network operator's criteria for ready to use, method 500 can then lift the probation status from the network element. For example, the deployment system can declassify the probation network element as normal and declassify the testers as normal subscribers as in steps 502 and 504. The deployment system can database and commit the configuration change and send the information to the provisioning server. If the P-CSCF function is part of the probation network elements, the provisioning server can modify the configuration parameters for the tester's end point devices as in steps 505 and 506. The modified configuration parameters can be uploaded to the device management system, which, in turn, updates the particular devices as in step 507. This allows the tester's device to be able to access other P-CSCFs based on normal business rules. In step 508, the provisioning server can modify its local database to mark the tester accounts as normal subscriber accounts. It can further communicate with all HSS servers to mark those tester accounts as normal accounts as in step 509. These tester subscribers can now be assigned to other S-CSCF and application servers.

If the HSS function is part of the probation network element, the provisioning server can modify its own local database to indicate the HSS server is not in probation mode as in step 510 and 512. This can allow the network to provision other subscriber's subscription profile to the new HSS server. If the S-CSCF function is part of the probation network element, the provisioning server can modify its own local database to indicate that the S-CSCF is not in probation mode as in steps 514 and 516. The provisioning server can communicate with all HSS servers to change the S-CSCF instances from probation mode to normal mode. If an application server instance is a part of the probation network element, the provisioning server can modify its local database to flag these application servers as being in normal operation mode as in steps 518 and 520.

In one embodiment, the use of a probation mode can be applied to I-CSCF functions. For example, testers can be provisioned in a temporary separate network domain. For instance, if the subscriber domain for an IMS-based network is "cvoip.att.net", the new temporary domain can be "cvoip_new.att.net". As a result, a normal customer account can be assigned a PUID in the form of the sip=+1-512-372-5450@cvoip.att.net. A tester's account can be assigned a PUID in the form of the sip=+1-512-372-5329@cvoip_new.att.net.

The provisioning procedure can configure all P-CSCFs in the network such that the P-CSCFs for the normal subscribers will continue to support the original domain. These P-CSCFs can forward any requests to those I-CSCFs in the same domain. A subset of the P-CSCFs (or the P-CSCFs in probation mode) support the new domain. These P-CSCFs can forward any requests to those I-CSCFs in the new domain. These I-CSCFs for the new domain would be the I-CSCFs in probation mode. When the probation is to be lifted for those new network elements, the P-CSCFs and I-CSCFs used in the temporary domain can be reconfigured to support the normal service domain. The provisioning server can also re-provision the tester account with a normal domain identifier in their PUID.

In one embodiment, a network element in a probation mode can implement one or more of the following IMS functions: P-CSCF, I-CSCF, S-CSCF, an application server, and/or an HSS server. The rest of the processes can depend on the functions implemented in the probation network element.

Upon reviewing the aforementioned embodiments, it would be evident to an artisan with ordinary skill in the art that said embodiments can be modified, reduced, or enhanced without departing from the scope and spirit of the claims described below. For example, the designated users or testers of a probation mode device can be selected based on various criteria, such as frequency of network use or type of network use (such as voice calls versus video content transmission). The criteria can be based on monitored behavior or history of the testers. By designating users with particular behavioral patterns, the system can focus the performance monitoring and troubleshooting for particular network elements.

In one embodiment, the deployment system can comprise various other components of the IMS network, such as a provisioning server and/or a device management server, that provide various deployment functions.

Other suitable modifications can be applied to the present disclosure without departing from the scope of the claims below. Accordingly, the reader is directed to the claims section for a fuller understanding of the breadth and scope of the present disclosure.

Figure 6:
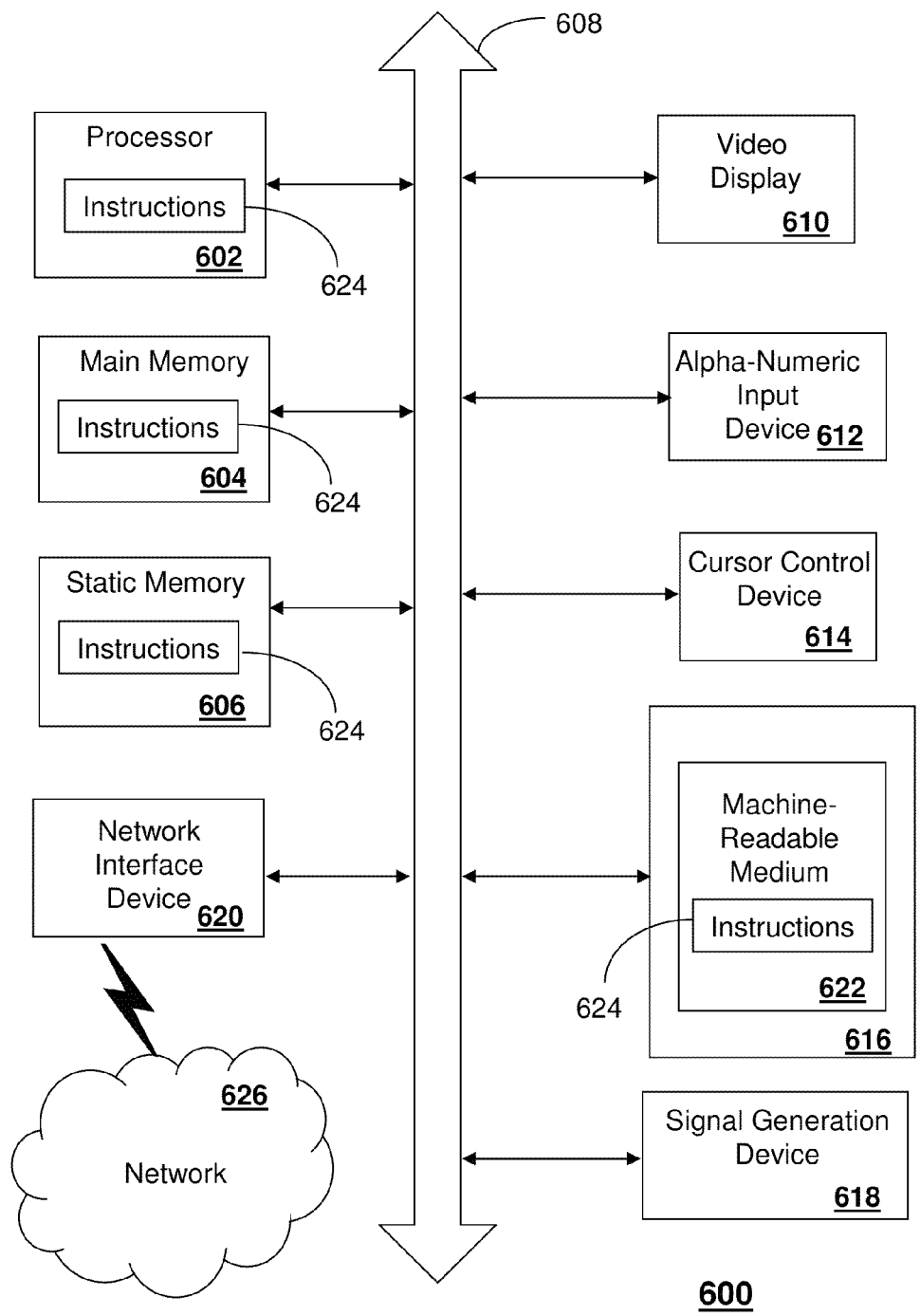
FIG. 6 is a diagrammatic representation of a machine in the form of a computer system within which a set of instructions, when executed, may cause the machine to perform any one or more of the methodologies discussed herein.

FIG. 6 depicts an exemplary diagrammatic representation of a machine in the form of a computer system 600 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 600 may include a processor 602 (e.g., a central processing unit (CPU), a graphics processing unit (GPU, or both), a main memory 604 and a static memory 606, which communicate with each other via a bus 608. The computer system 600 may further include a video display unit 610 (e.g., a liquid crystal display (LCD), a flat panel, a solid state display, or a cathode ray tube (CRT)). The computer system 600 may include an input device 612 (e.g., a keyboard), a cursor control device 614 (e.g., a mouse), a disk drive unit 616, a signal generation device 618 (e.g., a speaker or remote control) and a network interface device 620.

The disk drive unit 616 may include a machine-readable medium 622 on which is stored one or more sets of instructions (e.g., software 624) embodying any one or more of the methodologies or functions described herein, including those methods illustrated above. The instructions 624 may also reside, completely or at least partially, within the main memory 604, the static memory 606, and/or within the processor 602 during execution thereof by the computer system 600. The main memory 604 and the processor 602 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 624, or that which receives and executes instructions 624 from a propagated signal so that a device connected to a network environment 626 can send or receive voice, video or data, and to communicate over the network 626 using the instructions 624. The instructions 624 may further be transmitted or received over a network 626 via the network interface device 620.

While the machine-readable medium 622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A computer-readable device comprising executable instructions that, when executed, cause a machine to perform operations comprising:
classifying a network element as being in a probation operating mode that is constrained to communicate with a first subset of communication devices when the network element does not satisfy a criteria value, the first subset of communication devices being probationary testing devices inaccessible to a second subset of the communication devices;
providing configuration information to a device management server operably coupled to an Internet Protocol Multimedia Subsystem network, wherein the first subset of communication devices are registered with the network element based on the configuration information when the first subset of communication devices are communicatively coupled with the Internet Protocol Multimedia Subsystem network;
monitoring the network element to gather performance data while operating with the first subset of communication devices; and
declassifying the network element from the probationary operating mode to a normal operating mode in response to satisfaction of the criteria value associated with the performance data, the declassification to permit communication between the network element and the second subset of the communication devices.

2. The computer readable device as described in claim 1, further comprising instructions to:
determine whether the network element comprises an application server; and
adjust a filtering criteria of access plans associated with the first subset of communication devices when the network element comprises the application server.

3. The computer readable device as described in claim 2, wherein the adjusted filtering criteria allows a Session Initiation Protocol INVITE to be provided to the application server by a Serving Call Session Control Function of the Internet Protocol Multimedia Subsystem network.

4. The computer readable device as described in claim 1, further comprising instructions to:
determine whether the network element comprises a Home Subscriber Server; and
provide location of access plan information associated with the subset of communication devices to a subscriber location function server when the network element comprises the Home Subscriber Server.

5. The computer readable device as described in claim 1, further comprising instructions to classify the network element in the probation operating mode based on a user input, wherein the device management server is accessible by the probationary testing devices to adjust the configuration information.

6. A The computer readable device as described in claim 1, further comprising instructions to determine whether the network element comprises a Serving Call Session Control Function, wherein a Home Subscriber Server is to assign the subset of communication devices to the Serving Call Session Control Function when the first subset of communication devices communicate over the Internet Protocol Multimedia Subsystem network.

7. The computer readable device as described in claim 1, wherein when the instructions cause the machine to declassify the network element to the normal operating mode, the instructions are to classify the probationary testing devices as normal subscribers.

8. The computer readable device as described in claim 1, further comprising instructions to declassify the first subset of communication devices from probationary test devices to normal communication devices.

9. The computer readable device as described in claim 1, further comprising instructions to declassify a plurality of network elements in the probation operating mode in a gradual manner in response to an indication of stabilization of the Internet Protocol Multimedia Subsystem network.

10. A server comprising:
a controller to:
designate a network element as being in a probation operating mode that is constrained to communicate with probationary testing devices in the probation operating mode when the network element does not satisfy a criteria value;
designate a first subset of communication devices as the probationary testing devices, the first subset of communication devices being user end point devices that are inaccessible to a second subset of communication devices, wherein use of the network element for communication between user end points over an Internet Protocol Multimedia Subsystem network is limited to the probationary testing devices in the probation operating mode;
monitor the network element to gather performance data while operating with the first subset of communication devices; and
lift the probation operating mode for the network element in response to satisfaction of the criteria value associated with the network element performance data, the lift of the probation operating mode to permit communication access of the network element with the second subset of communication devices.

11. The server of claim 10, wherein the controller is to:
generate configuration information associated with the first subset of communication devices when the network element includes Proxy Call Session Control Function; and
provide the configuration information to a device management server operably coupled to the Internet Protocol Multimedia Subsystem network, wherein the first subset of communication devices are registered with the network element based on the configuration information when the probationary testing devices communicate over the Internet Protocol Multimedia Subsystem network.

12. The server of claim 10, wherein the controller is to
determine whether the network element comprises a Home Subscriber Server; and
provide a location of access plan information associated with the first subset of communication devices to a subscriber location function server when the network element comprises the Home Subscriber Server.

13. The server of claim 10, wherein the controller is to:
determine whether the network element comprises a Serving Call Session Control Function, wherein a Home Subscriber Server is to assign the first subset of communication devices to the Serving Calling Session Control Function when the first subset of communication devices communicate over the Internet Protocol Multimedia Subsystem network.

14. The server of claim 13, wherein the controller is to lift the probation operating mode for the network element by sending configuration change information to a provisioning server, wherein when a Proxy Call Session Control function is part of the network element in the probation operating mode then the provisioning server is to modify configuration parameters for the user end point devices and to transmit the modified configuration parameters to a device management system, wherein the provisioning server is to modify a local database to mark tester accounts associated with the first subset of communication devices as normal subscriber accounts and is to communicate with Home Subscriber servers to mark the tester accounts as normal subscriber accounts.

15. The server of claim 10, wherein the controller is to:
determine whether the network element comprises an application server; and
adjust access plans associated with the first subset of communication devices when the network element comprises the application server.

16. A method, comprising:
classifying a network element as in a probation operating mode that is constrained to operate with a first subset of communication devices when the network element does not satisfy a criteria value, the first subset to operate in the probation operating mode as probationary testing devices inaccessible to a second subset of communication devices;
limiting use of the network element to communication between user end points over an Internet Protocol Multimedia Subsystem network to the first subset of communication devices;
monitoring the network element to gather performance data while operating with the first subset of communication devices; and
declassifying the network element from the probation operating mode to a normal operating mode in response to satisfaction of the criteria value associated with the performance data, the declassification to permit communication access of the network element with the second subset of communication devices.

17. The method of claim 16, further comprising:
determining whether the network element comprises an application server; and
adjusting access plans associated with the probationary testing devices when the network element comprises the application server.

18. The method of claim 16, further comprising:
determining whether the network element comprises a Serving Call Session Control Function; and
using a Home Subscriber Server to assign the first subset of communication devices to the Serving Call Session Control Function when the first subset of communication devices communicate over the Internet Protocol Multimedia Subsystem network.

19. The method of claim 16, further comprising:
determining whether the network element comprises a Home Subscriber Server; and
providing a location of access plan information associated with the first subset of communication devices to a subscriber location function server when the network element comprises the Home Subscriber Server.

20. The method of claim 16, wherein the classifying of the network element and the classifying of the communication devices is based on user inputs.

* * * * *